United States Patent
Dreisinger

(12) 
(10) Patent No.: US 6,200,545 B1
(45) Date of Patent: Mar. 13, 2001

(54) CYANIDE RECOVERY BY SOLVENT EXTRACTION

(76) Inventor: David Bruce Dreisinger, 5233 Beatley Crescent, Delta, British Columbia (CA), V4K 4K1

( * ) Notice: Subject to any disclaimer, the term of this patent is extended or adjusted under 35 U.S.C. 154(b) by 0 days.

(21) Appl. No.: 09/235,876

(22) Filed: Jan. 22, 1999

(51) Int. Cl.$^7$ ................. C02F 1/26; C01C 3/00; C01C 3/08
(52) U.S. Cl. ............ 423/371; 210/634; 210/639; 210/903; 210/904; 423/24; 423/29; 423/372; 588/246
(58) Field of Search .................... 423/371, 372, 423/29, 24; 210/904, 903, 708, 634, 639; 588/246

(56) References Cited

U.S. PATENT DOCUMENTS

| | | |
|---|---|---|
| 3,429,694 | 2/1969 | Lower . |
| 3,975,502 | 8/1976 | Mahler et al. ............... 423/372 |
| 3,984,314 | 10/1976 | Fries ................... 210/30 R |
| 4,026,790 | 5/1977 | Moore . |
| 4,239,620 | 12/1980 | Doll et al. .................... 210/601 |
| 4,267,159 | 5/1981 | Crits .......................... 423/371 |
| 4,519,880 | 5/1985 | Byerley et al. ............... 204/91 |
| 4,526,662 | 7/1985 | Byerley et al. ............... 204/86 |
| 4,537,686 | 8/1985 | Borbely et al. .............. 210/713 |
| 4,540,435 | * 9/1985 | Miller ........................ 75/118 |
| 4,657,642 | 4/1987 | Miller et al. ............... 204/59 M |
| 4,895,659 | 1/1990 | Semmens et al. .............. 210/638 |
| 4,994,243 | 2/1991 | Goldstone et al. ............ 423/29 |
| 5,078,977 | 1/1992 | Mudder et al. ............... 423/1 |
| 5,177,019 | 1/1993 | Devon et al. ............... 436/104 |
| 5,254,153 | 10/1993 | Mudder et al. ............... 75/732 |
| 5,284,991 | 2/1994 | Chu . |
| 5,364,605 | 11/1994 | Pfeffer et al. ............... 423/236 |

FOREIGN PATENT DOCUMENTS

| | | | |
|---|---|---|---|
| 0698 401 | 4/1995 | (EP) | ................... A62D/3/00 |
| 55-112192 | 8/1980 | (JP) | ................... C01C/3/00 |

OTHER PUBLICATIONS

Kruse, J.M. & Mellon, M.G., (1951), *Colorimetric Determination of Cyanide*, Sewage and Industrial Wastes, 23(11):1402–1407.

Montgomery, et al. (1969), *Determination of Free Hydrogen Cyanide in River Water by a Solvent–Extraction Method*, Analyst, 94:284–291.

(List continued on next page.)

*Primary Examiner*—Steven P. Griffin
*Assistant Examiner*—Maribel Medina
(74) *Attorney, Agent, or Firm*—Townsend and Townsend and Crew LLP

(57) ABSTRACT

The invention provides a process for recovering hydrogen cyanide from an aqueous solution by extracting the hydrogen cyanide into an organic solvent phase. The organic solvent may comprise a neutral organophosphorous compounds, such as compounds selected from the group consisting of alkyl or aryl substituted phosphates, phosphonates and phosphine oxides. In alternative embodiments the organophosphorous compound is tri-butyl phosphate, di-butyl-butyl-phosphonate or tri-alkyl phosphine oxides. The organic solvent may be diluted in an organic diluent, such as an aliphatic or kerosene-type diluent. Alternative dilutions may be used, such as 75%, 50% or 25%. In some embodiments, the pH of the aqueous solution containing dissolved cyanide may be adjusted to between 2 and 8, or between 3 and 7, or between 4 and 6. The organic solvent may be contacted following extraction with a basic aqueous solution to strip cyanide from the organic solvent into a basic aqueous cyanide strip solution. The stripped organic solvent may then be returned to the loading process, to extract HCN from fresh aqueous solution.

22 Claims, 16 Drawing Sheets

OTHER PUBLICATIONS

Koh, T. et al. (1985), *Spectrophotometric Determination of Micro Amounts of Cyanide by Solvent Extraction with Methylene Blue*, Bunseki Kagaku, 34(2):95–99.

Kuroda, D. et al. (1989), *Determination of Cyanide in Plants by FT–IR*, Kyokai, 63(3):125–127.

Miller, J.D. et al. (1987), Selective Solvation Extraction of Gold from Alkaline Cyanide Solution by Alkyl Phosphorus Esters, Separation Science & Technology, 22(2&3):487–502.

Mooiman, M.B. & Miller, J.D. (1991), The Chemistry of Gold Solvent Extraction from Alkaline Cyanide Solution by Solvating Extractants, Hydrometallurgy, 27:29–46.

Alguacil, F.J. et al. (1994), The Extraction of Gold (I) from Cyanide Solutions by the Phosphine Oxide Cyanex 921, Hydrometallurgy, 35:41–52.

Alguacil, F.J. et al. (1998), Extraction of Gold from Cyanide or Chloride Media by Cyanex 923, J. Chem. Technol. Biotechnol., 72:339–346.

Miller, J.D. & Mooiman, M.B. (1984), A Review of New Developments in Amine Solvent Extraction Systems for Hydrometallury, Separation Science and Technology, 19(11&12):895–909.

Miller, J.D. & Garcia, C.A. (1993), Solvent Extraction Reagents for Gold Recovery from Alkaline Cyanide Solutions, in Emerging Separation Technologies for Metals and Fuels, Lakshmanan, et al. (Ed.), 93–109.

Alguacil, F.J. & Caravaca, C. (1996), Synergistic Extraction of Gold (I) Cyanide with the Primary Amine Primene JMT and the Phosphine Oxide Cyanex 921, Hydrometallurgy, 42:197–208.

Alguacil, F.J. et al. (1997), Solvent Extraction of Au(CN)2 with Mixtures of the Amine Primene JMT and the Phosphine Oxide Cyanex 923, Hydrometallurgy, 44:359–369.

Martin, M.I. & Alguacil, F.J. (1998), Synergism in Gold–Cyanide Extraction with Primene JMT–Cyanex 925 Mixed Extractant System, Hydrometallurgy, 49:309–322.

Sibrell, P.J. & Miller J.D. (1986), Soluble Losses in the Solvent Extraction of Gold from Alkaline Cyanide Solutions by Modified Amines, from Int'l. Solvent Extraction Conference, Munich, Germany, 187–196.

Alguacil, F.J. et al. (1989), Extraction of KAu(CN) sub 2 and Other Metal Cyanide Complexes with Amines, Rev. Metal. 25(3):176–183.

Moore, F.L. & Groenier, W.S. (1976), Removal and Recovery of Cyanide and Zinc from Electroplating Wastes by Solvent Extraction, Plating and Surface Finishing, 63(8):26–29.

Moore, F.L. (1975), Liquid–Liquid Extraction of Zinc with High–Molecular–Weight Amines from Alkaline Cyanide Solutions, Separation Science, 10(4):489–497.

Deniges, M.G. (1940), Valeur des Coefficients de Partage Entre Les Solutions Aqueoses D'Acide Cyanhydrique et Quelques, Anesthesiques et Solvants Organiques Bulletin des Travaux de la Societe de Pharmacie de Bordeaux, 78:61–65.

Battelle Columbus Laboratories (1971), *An Investigation of Techniques for Removal of Cyanide from Electroplating Wastes*, U.S. Environmental Protection Agency.

Davis, MR. et al., *Recovery of Cu and CN by SX from Solutions Produced in Leaching of Cu/Au Ores*.

Barkley, D.J. & Ingles, J.C. (1970), Colorimetric Solvent–Extraction Procedure for the Determination of Cyanide in Gold–Mill Effluents and Receiving Waters, Can., Mines Br., Res. Rep., 221, 40pp.

Adrian, A.B. et al. (1967), Solvent Extraction of Copper Cyanide, Nat. Inst. Met., Repub. S. Afr., Res. Rep., 175, 15pp.

Gasali, A.C. et al. (1983), Concentration of Gold and Silver Cyanide Solutions by Liquid–Liquid Extraction, An. Congr. Nac. Metal., 3rd, 2:B193–B200.

Chen, J. et al. (1998), Solvent Extraction of Gold Cyanide with Tri–Butyl–Phosphate and Additive Added in Aqueous Phase, Precious Met., 22:65–74.

Pan, X. & Chen, J. (1999), Study on Gold(I) Solvent Extraction from Alkaline Cyanide Solution by TBP with Addition of Surfactant, Rare Met., 18(2):88–96.

Fleming, C.A., "Thirty Years of Turbulent Change in the Gold Industry" CIM Bulletin (1998), vol. 91, No. 1025, p55–67.

Riveros, P.A. et al. "Cyanide Recovery from a Gold Mill Barren Solution Containing High levels of Copper". CIM Bulletin (1998), vol. 91, No. 1025, p73–81.

Chem. abstr., (Columbis, OH. USA) vol. 112, the abstract No. 185199, Huang, P., et al. "Two new liquid membrane systems for simultaneous removal of two components", Huanan Ligong Daxue Xuebao, Ziran Kexueban, 16(3), 55–64.

Chem. abstr. (Columbus OH, USA) vol. 112, the abstract No. 43638, Furton, K.G. et al. "Stability constants of hydracid–tributyl phosphate complexes in alkane solution: hydrochloric acid and hydrogen cyanide", J. Chromatogr., Volume Date 1988, 468, 73–89 (English) 1989.

Chem. abstract., (Columbus, OH, USA) vol. 128, the abstract No. 65865, Durand, G. et al., "Extraction of residual low concentration of cyanide from an industrial effluent by a surfactant liquid membrane process", Pap ISEC'96, vol.2, 1553–1558 (English) 1996.

Chem. abstract., (Columbus, OH, USA) vol. 107, the abstract No. 45707, Coltrinari, E.L. "Method for recovery of cyanide from waste streams", PCT Int. Appl. WO 8700072 A1 Jan. 15, 1987, 66pp.

Chem. abstr. (Columbus, OH, USA) vol. 119, the abstract No. 167040, Whittle, L., "The piloting of Vitrokele for cyanide recovery and waste management at two Canadian gold mines", Randol Gold Forum, 379–84. Randol Int.: Golden, Colo. (English) 1992.

Chem. abstr. (Columbus, OH, USA) vol. 109, the abstract No. 9747, Semmens, M.J. et al., "The GM–IX process: a novel metal cyanide treatment and recovery technique:", Proc. Ind. Waste Conf., 1987, 42nd, 883–91 (English) 1988.

Chem. abstr. (Columbus, OH, USA), vol. 110, the abstract No. 140877, Semmens, M.J. et al., "Selective cyanide recovery from wastewater containing metal cyanide complexes", Proc. Ind. Waste Conf., 1988, 43rd, 711–19 (English) 1989.

Chem. abstr. (Columbus, OH, USA), vol. 121, the abstract No. 90673, De Araujo, R.V.V., et al., "Application of an ion–exchange resin in the absorption of free cyanide and metal cyanides", An. Assoc. Bras. Quim., 41–42(1–4), 14–16 (Portuguese) 1993.

Chem. abstr. (Columbus, OH, USA), vol. 109, the abstract No. 79161, Pearson, D.E., "Separation of metallic and cyanide ions from electroplating solutions", U.S. US 4752400 A Jun. 21, 1988, 4pp. (United States of America).

Chem. abstr. (Columbus, OH, USA), vol. 119, the abstract No. 124266, Omofoma, M.A. et al., "Cyanide recovery in a CCD Merrill–Crowe circuit: pilot testwork of a Cyanisorb Process at the Nerco DeLamar Silver Mine", Randol Gold Forum, 359–65, (English) 1992.

Chem. abstr. (Columbus, OH, USA), vol. 128, the abstract No. 259793, Riveros, P.A. et al., "Large–scale treatment of a concentrated cyanide waste solution by acidification", CIM Bull., 91(1017), 93–95 (English) 1998.

Chem. abstr. (Columbus, OH, USA), vol. 113, the abstract NO. 9870, Mudder, T.I. et al., "Cyanide recovery by volatilization", PCT Int. Appl. WO 9004655 A1 May 3, 1990, 55 pp.

Chem. abstr. (Columbus, OH, USA), vol. 119, the abstract No. 100284, Riveros, P.A. et al., "Alternative technology to decrease the environmental impact of gold milling—a progress report on CANMET research activities in this field", CIM Bull., 86(968), 167–71 (English) 1993.

Chem. abstr. (Columbus, OH, USA), vol. 120, the abstract No. 274645, Mudder, T.I. et al., "Recycling of hydrogen cyanide", PCT Int. Appl. WO 9314231 A1 Jul. 22, 1992, 32 pp.

Chem. abstr. (Columbus, OH, USA), vol. 127, the abstract NO. 97857, Soto, H. et al., "Cyanide regeneration and copper recovery from cyanide solutions", Global Exploit. Heap Leachable Gold Deposits, Proc. TMS Symp., 151–160, (English) 1997.

Chem. asbr. (Columbus, OH, USA), vol. 127, the abstract No. 222601, Stevenson, J.A. et al., "Recovery of cyanide from mill tailings", Randol Gold Forum '96, Conf. Proc., 179–181, (English) 1996.

Chem. abstr. (Columbus, OH, USA), vol. 113, the abstract No. 87056, Semmens, M.J., "Method for metal and cyanide recovery from electroplating baths and rinse waters", U.S. US 4895659 A Jan. 23, 1990, 12 pp. (United States of America).

Chem. abstr. (Columbus, OH, USA), vol. 118, the abstract No. 153606, Maracle, K.J. et al., "Membrane–based recovery/treatment system for gold mill barren bleeds", Waste Process, Recycl. Min, Metall. Ind. Proc. Int. Symp., 105–18, (English) 1992.

Chem. abstr. (Columbus, OH, USA), vol. 111, the abstract No. 159613, Qian, X. et al., "Removal of cyanide from wastewater with liquid membranes", Shuichuli Jishu, 15(1), 15–21 (Chinese) 1989.

Chem. abstr. (Columbus, OH, USA), vol. 122, the abstract No. 193198, Jin, M. et al., "Pilot test of treating cyanide–containing wastewater from the gold concentration plant by emulsion liquid membrane", Mo Kexue Yu Jishu. 14(4), 16–28 (Chinese) 1994.

* cited by examiner

Prior Art AVR Process

US 6,200,545 B1

CYANIDE RECOVERY BY SOLVENT EXTRACTION

FIELD OF THE INVENTION

The invention is in the field of processes for the recovery of cyanide from aqueous solutions, particularly waste solutions from gold ore processing operations.

BACKGROUND OF THE INVENTION

Cyanide solutions are widely used in a number of chemical processes. A common use of cyanide is in the leaching of gold. The chemistry by which cyanide leaches gold may be expressed as follows:

$$4Au+8NaCN+O_2+2H_2O \rightarrow 4NaAu(CN)_2+4NaOH \tag{1}$$

Gold is usually present in very low concentrations in naturally occurring ores and in concentrates derived from such ores. Typical gold concentrations are in the range of from about 1 g/tonne for some ores to about 1000 g/tonne for some concentrates. In the leaching process, cyanide is typically added to ores or concentrates at elevated pH to keep cyanide in solution and to thereby prevent the formation and evolution of highly toxic HCN gas. To help maximize the efficiency of leaching, cyanide is typically added in excess of the stoichiometric amount required for leaching in accordance with reaction 1. The excess cyanide is required in part because cyanide typically reacts with other minerals, is oxidized or volatilizes from the system.

Following leaching, gold may be recovered by a number of processes, such as zinc cementation or carbon adsorption, leaving a barren solution. The presence of excess cyanide in the barren solution at the end of the gold leaching and recovery operation creates a disposal problem for gold leaching plants. A variety of approaches may be taken to address this problem. The cyanide may be discharged to the environment if the cyanide concentration is sufficiently low. The cyanide may be destroyed using a chemical or biological treatment method, such as known methods of $SO_2$/air treatment, alkaline chlorination, biological oxidation, hydrogen peroxide treatment or Caro's acid treatment. The cyanide may be recovered for recycle by known methods such as AVR (acidification, volatilization and re-neutralization), AFR (acidification, filtration and reneutralization), or MNR (Metallgeselshaft Natural Resources) processes, the Cyanisorb™ process, or the Augment™ process.

The AVR process has been of interest to gold processors for a long time. The process involves addition of acid to a waste cyanide solution followed by volatilization of HCN gas, reneutralization and scrubbing of volatile HCN from the stripping air, in accordance with the reactions 2, 3 and 4.

Acidification:

$$2CN^-+H_2SO_4 \rightarrow 2HCN(aq)+SO_4^{2-} \tag{2}$$

Volatilization:

$$2HCN(aq) \xrightarrow{Airstripping} 2HCN(g) \tag{3}$$

Reneutralization:

$$2HCN(g)+2NaOH(aq) \rightarrow 2NaCN(aq)+2H_2O \tag{4}$$

NaCN recovered from the reneutralization step of an AVR process may be returned to a leaching process. The AVR process may be particularly useful when cyanide is present as metal complexes such as copper cyanides. As shown in equation 5, two of the three cyanides in the copper cyanide complex may be recovered by this method while copper is recovered as a CuCN precipitate.

$$Cu(CN)_3^{2-}+H_2SO_4 \rightarrow 2HCN(aq)+SO_4^{2-}+CuCN(s) \tag{5}$$

The AVR method suffers from a number of potentially important drawbacks, including volatilization of dangerous HCN gas and inefficiencies that may raise costs. Volatile HCN is acutely toxic, which raises important safety concerns, particularly in areas where there is a higher risk of leaching plant disruption due for example to power outages. HCN is a soluble acid that is difficult to strip using air so that the size and cost (capital and operating) for volatilization operations may be significant. Also, the large volumes of gas typically used for volatilization must be scrubbed with NaOH to ensure good cyanide recovery and to minimize HCN loss in any discharged 'tail' gas, a process that may further raise costs.

A second known method of dissolved cyanide recovery is the MNR process. This process differs slightly from the AVR process in that NaSH (sodium hydrosulfide) is added during acidification. The NaSH is thought to maximize cyanide recovery by converting base metal cyanides to metal sulfides, as shown in equations 6 through 9.

Acidification and Sulfidization $$2CN^-+H_2SO_4 \rightarrow 2HCN(aq)+SO_4^{2-} \tag{6}$$

$$2Cu(CN)_3^{2-}+5/2H_2SO_4+NaSH \rightarrow Cu_2S+6HCN(aq)+5/2SO_4^{2-}+Na^+ \tag{7}$$

Volatilization $$2HCN(aq) \xrightarrow{Airstripping} 2HCN(g) \tag{8}$$

Reneutralization $$2HCN(g)+2NaOH(aq) \rightarrow 2NaCN(aq)+2H_2O \tag{9}$$

The MNR process suffers from many of the same drawbacks as the AVR process, since HCN is volatilized and scrubbed.

It is an object of the invention to provide a process for the recovery of cyanide from aqueous solutions that my be used as an alternative to known processes such as volatilization and reneutralization of HCN as part of AVR or MNR processes.

SUMMARY OF THE INVENTION

The invention provides a process for recovering hydrogen cyanide from an aqueous solution by extracting the hydrogen cyanide into an organic solvent phase. The organic solvent may comprise a neutral organophosphorous compounds, such as compounds selected from the group consisting of alkyl or aryl substituted phosphates, phosphonates and phosphine oxides. In alternative embodiments the organophosphorous compound is tri-butyl phosphate, di-butyl-butyl-phosphonate or tri-alkyl phosphine oxides. The organic solvent may be diluted in an organic diluent, such as an aliphatic or kerosene-type diluent. Alternative dilutions may be used, such as 75%, 50% or 25%. In some embodiments, the pH of the aqueous solution containing dissolved cyanide may be adjusted to between 2 and 8, or between 3 and 7, or between 4 and 6. The organic solvent may be contacted following extraction with a basic aqueous solution to strip cyanide from the organic solvent into a basic aqueous cyanide strip solution. The stripped organic solvent may then be returned to the loading process, to extract HCN from fresh aqueous solution.

DETAILED DESCRIPTION OF THE INVENTION

Figure 1:
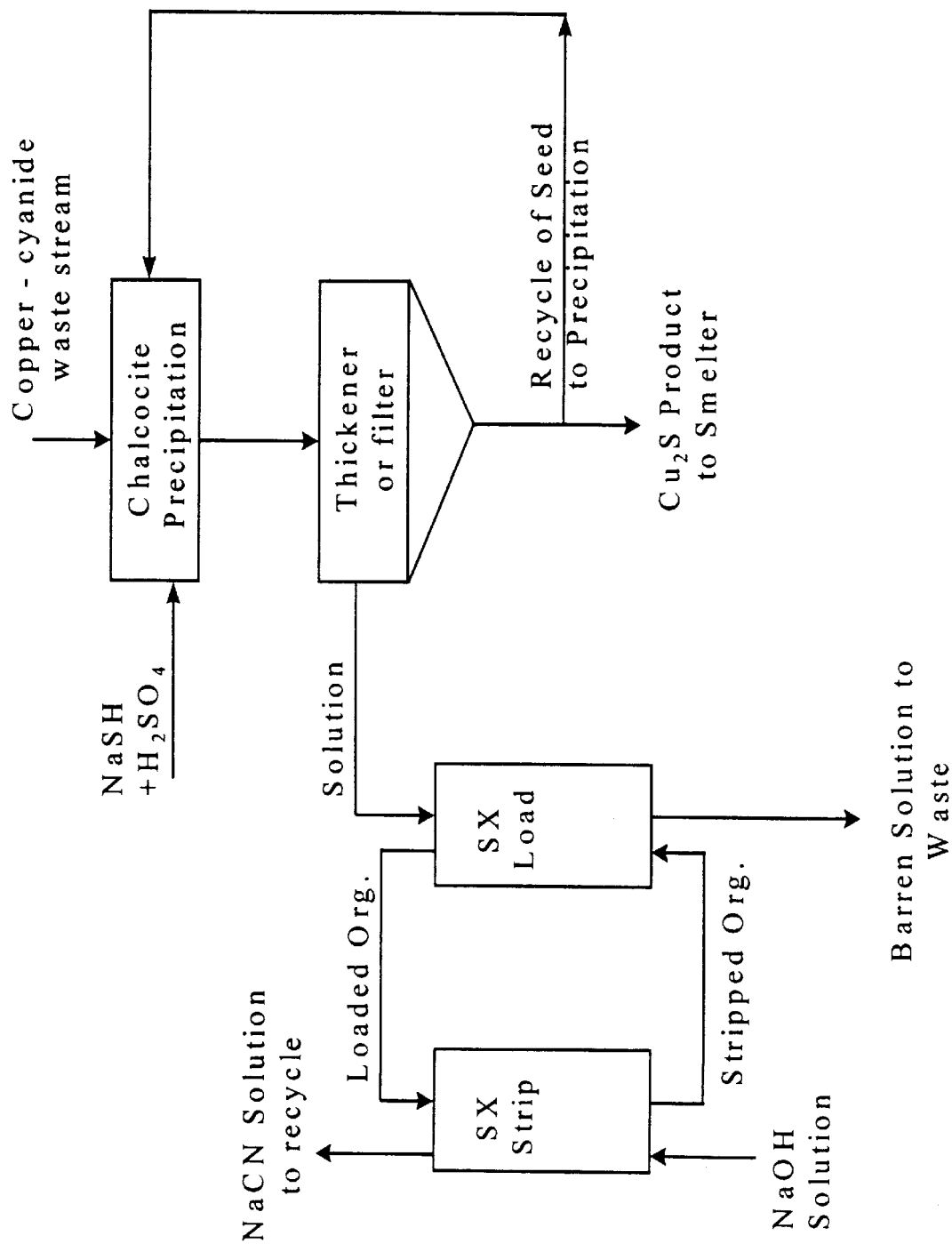
FIG. 1 is a conceptual flowsheet for HCN Recovery using solvent extraction (SX) loading and stripping. The generation of an HCN containing stream is shown via the MNR generation of a copper sulfide precipitate.
Figure 2:
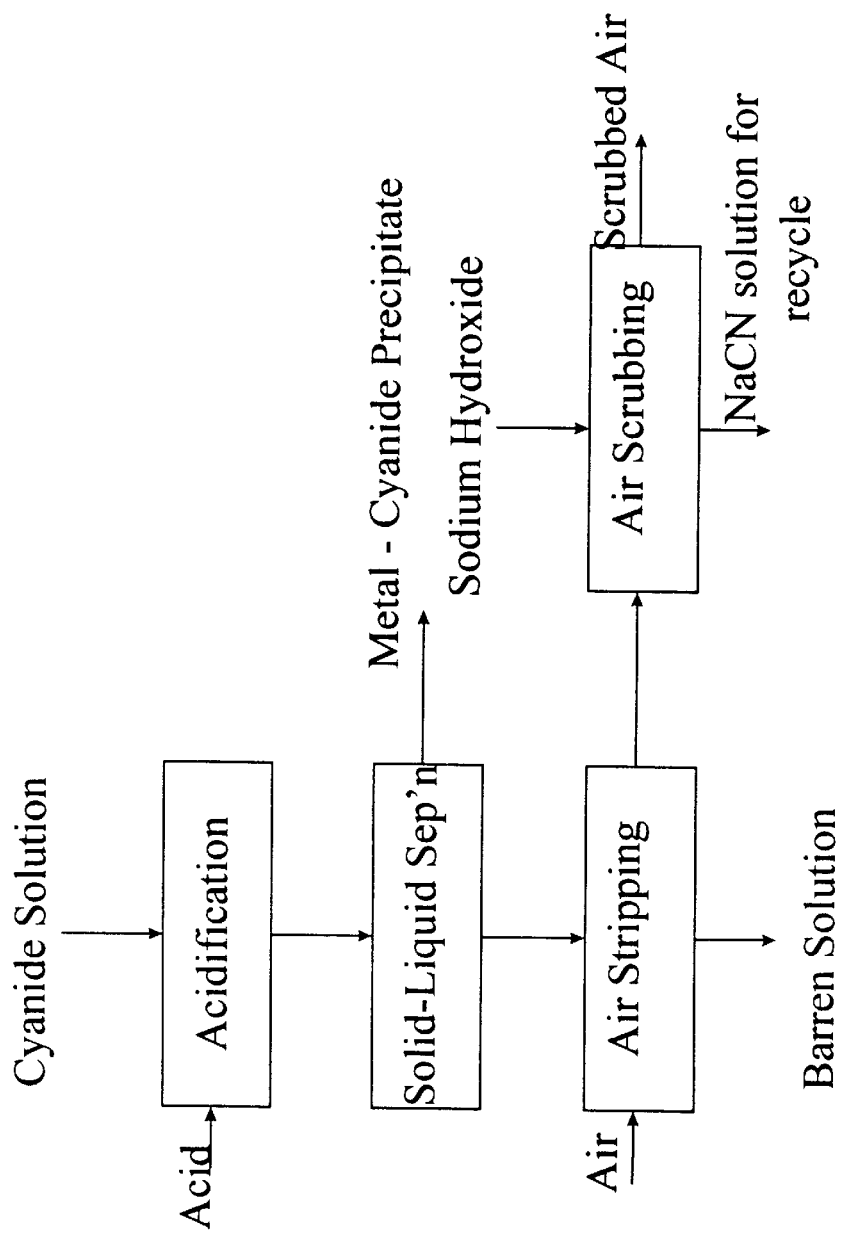
FIG. 2 is a conceptual flowsheet showing a prior art AVR Process.
Figure 3:
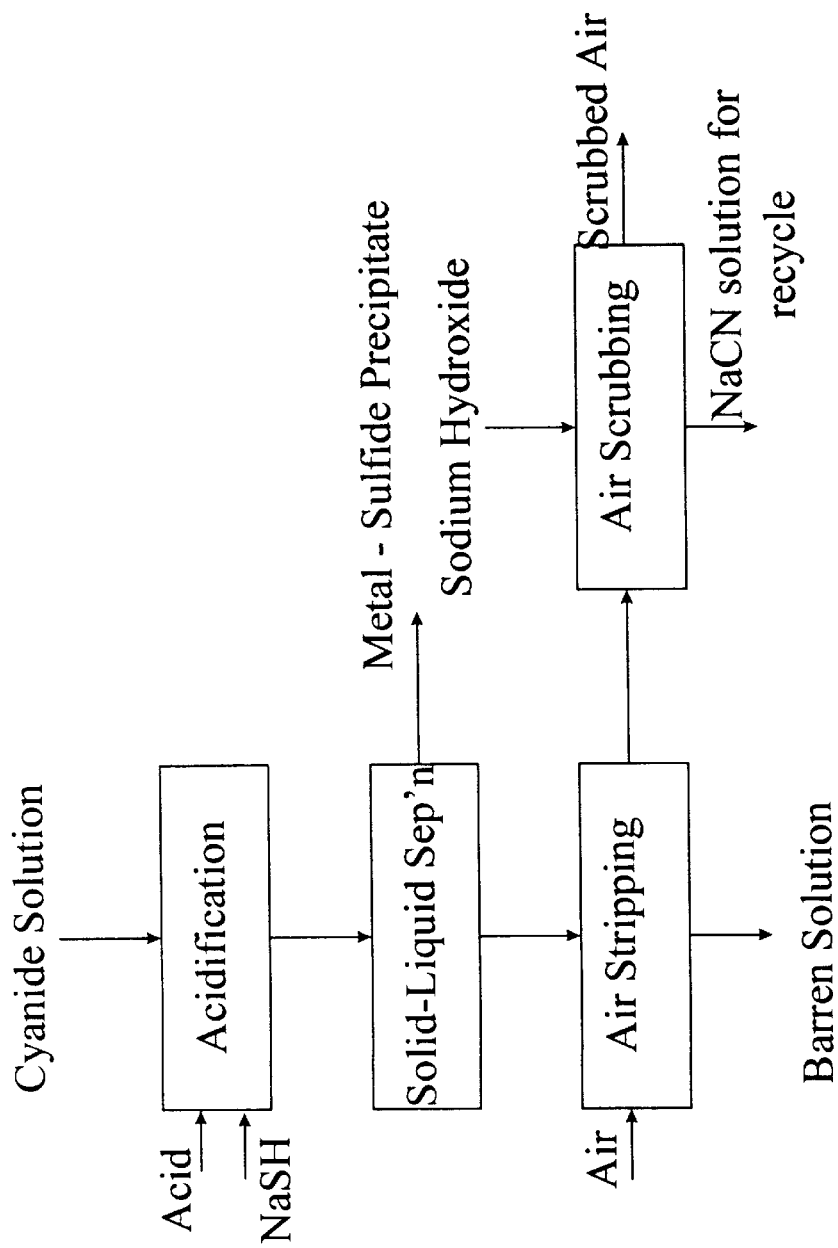
FIG. 3 is a conceptual flowsheet showing a prior art MNR Process.
Figure 4:
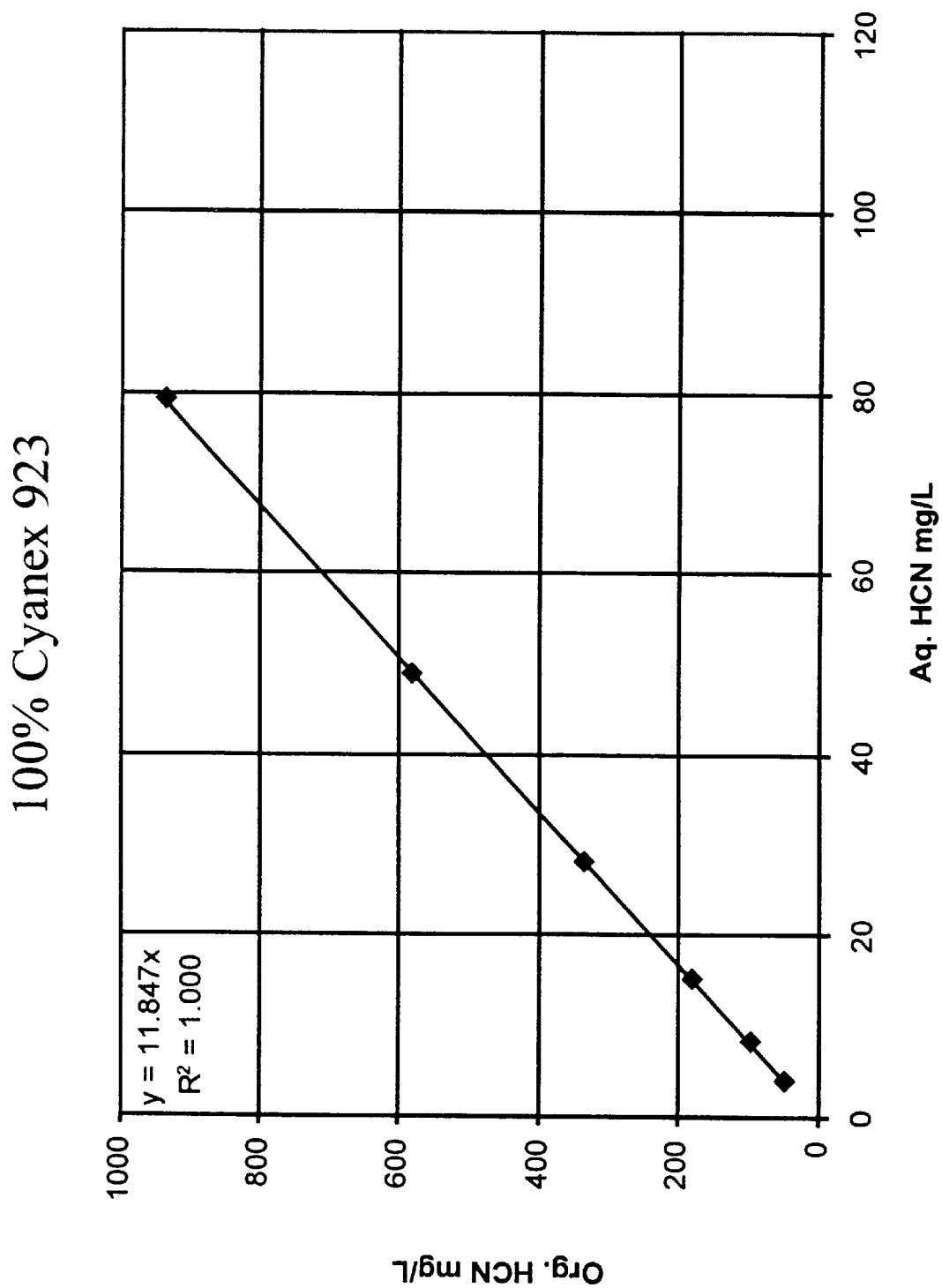
FIG. 4 is a graph showing extraction of HCN with 100% Cyanex 923.
Figure 5:
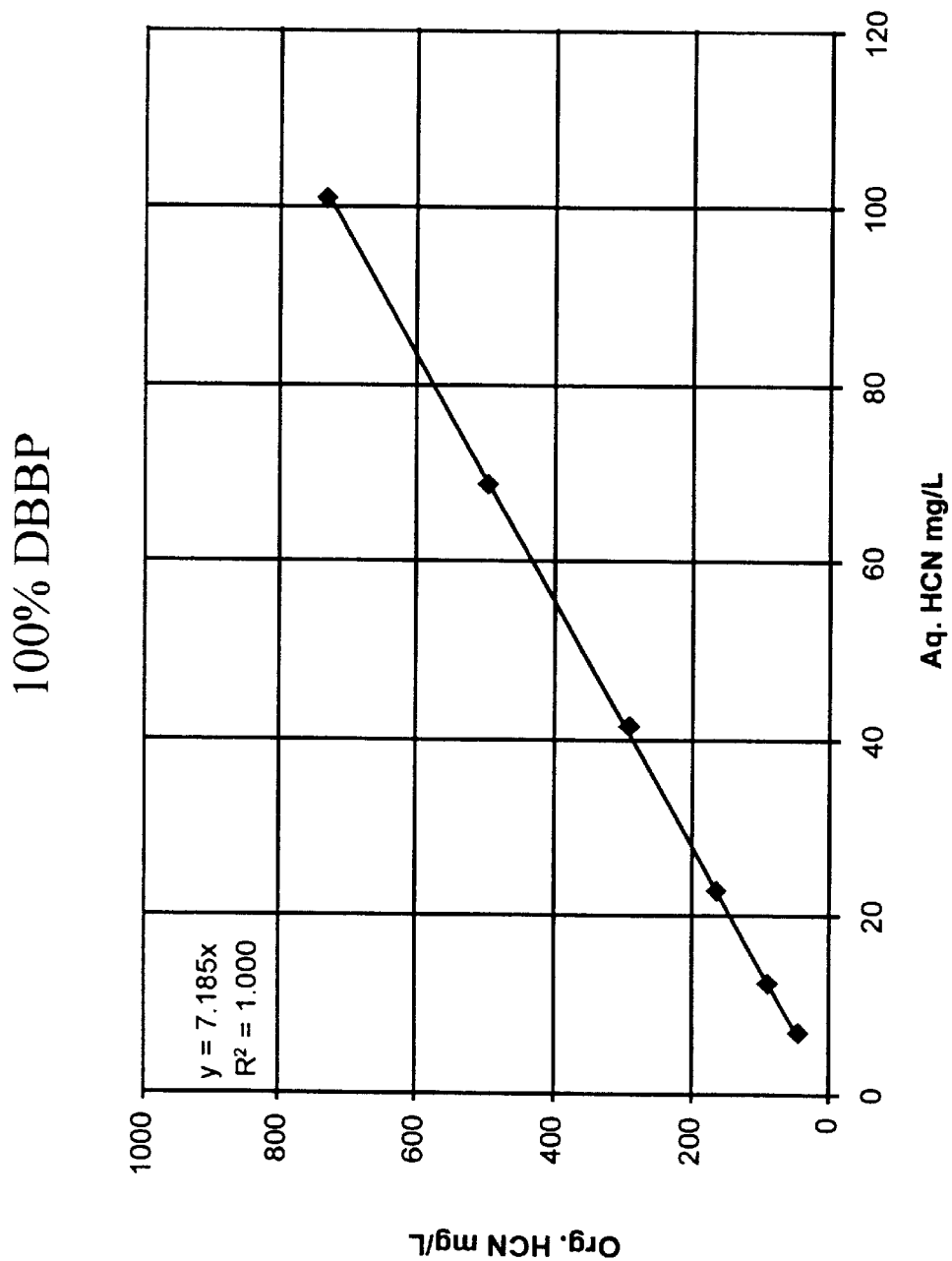
FIG. 5 is a graph showing extraction of HCN with 100% DBBP.
Figure 6:
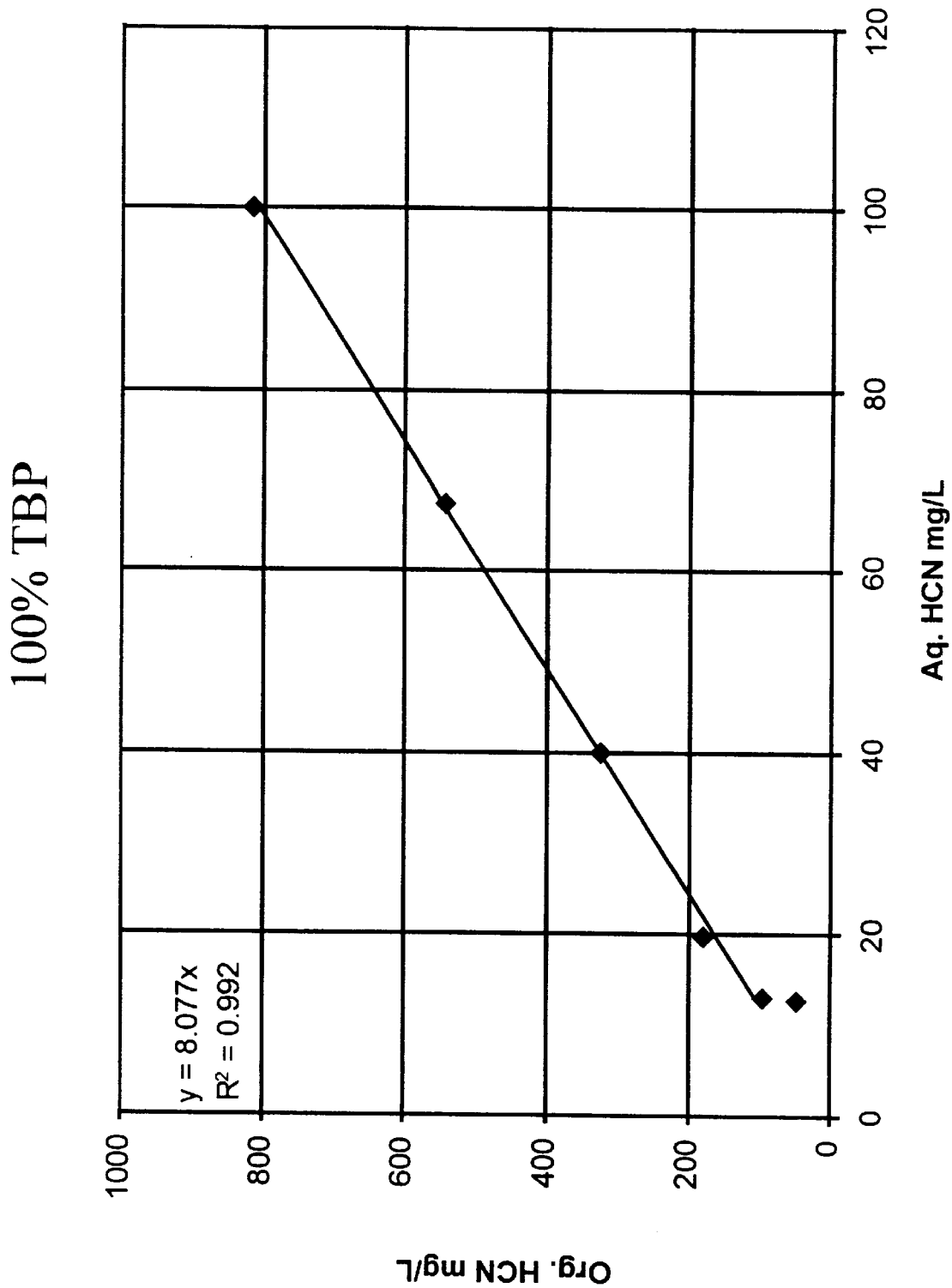
FIG. 6 is a graph showing extraction of HCN with 100% TBP.
Figure 7:
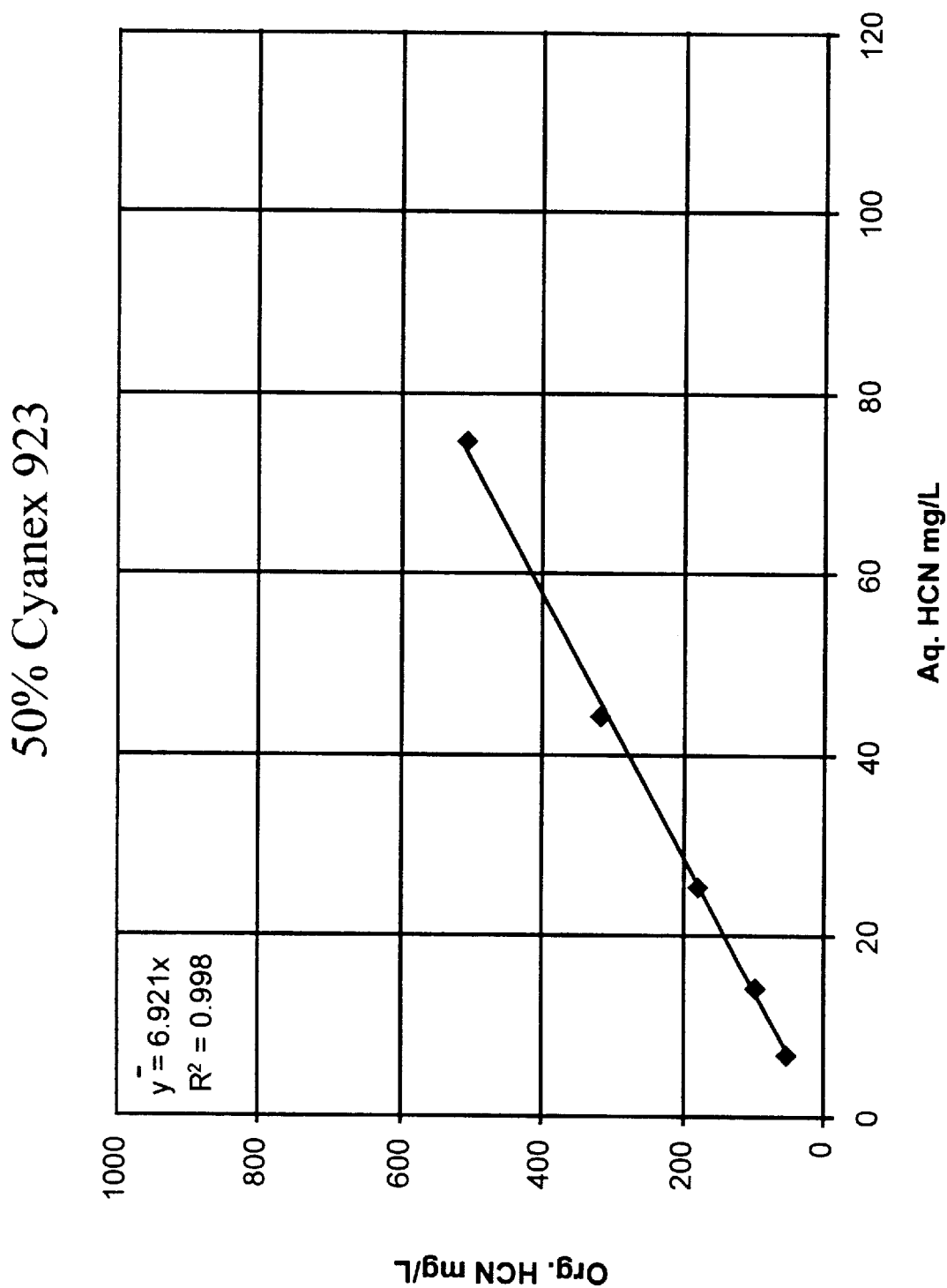
FIG. 7 is a graph showing extraction of HCN with 50% Cyanex 923.
Figure 8:
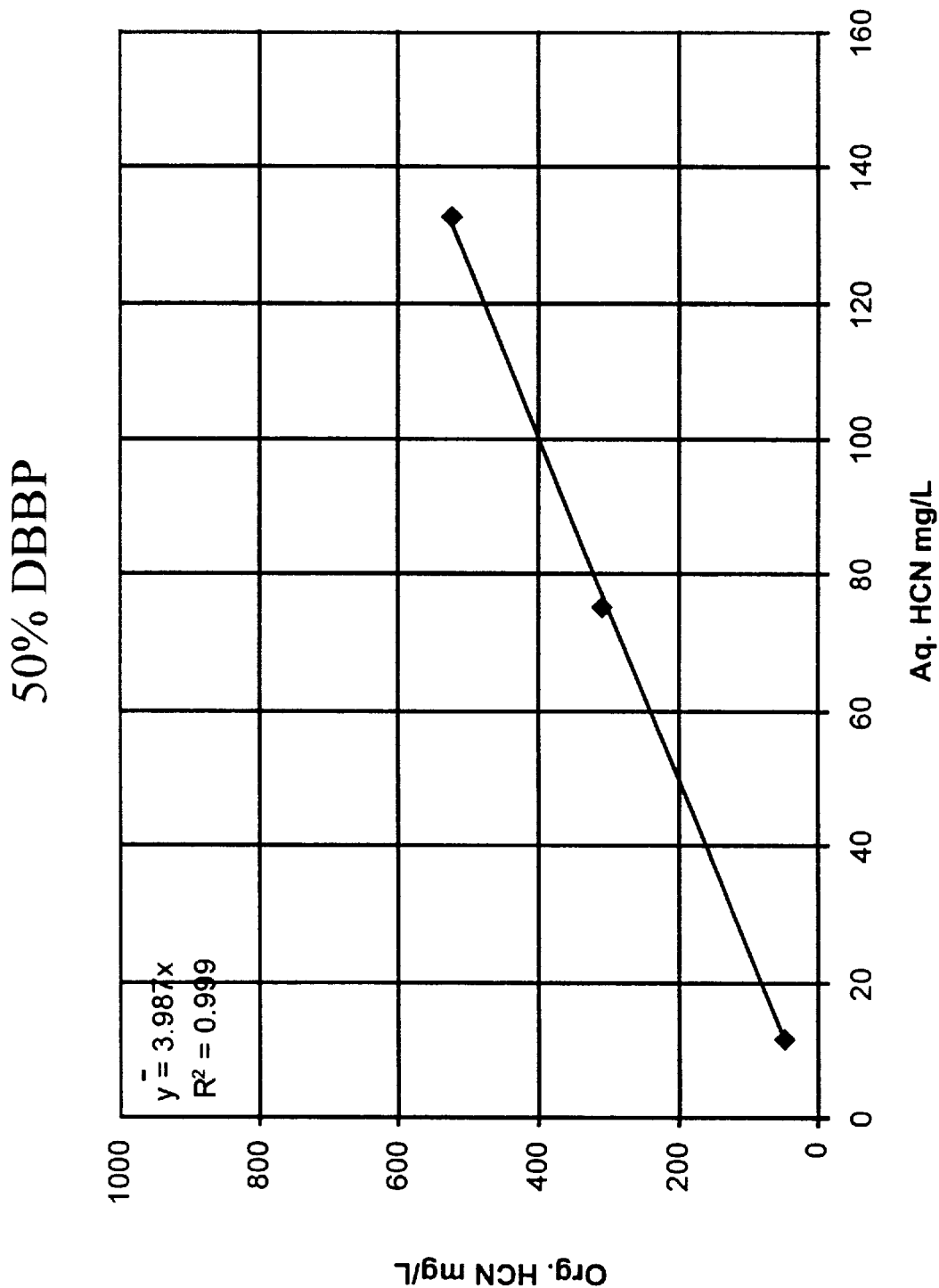
FIG. 8 is a graph showing extraction of HCN with 50% DBBP.
Figure 9:
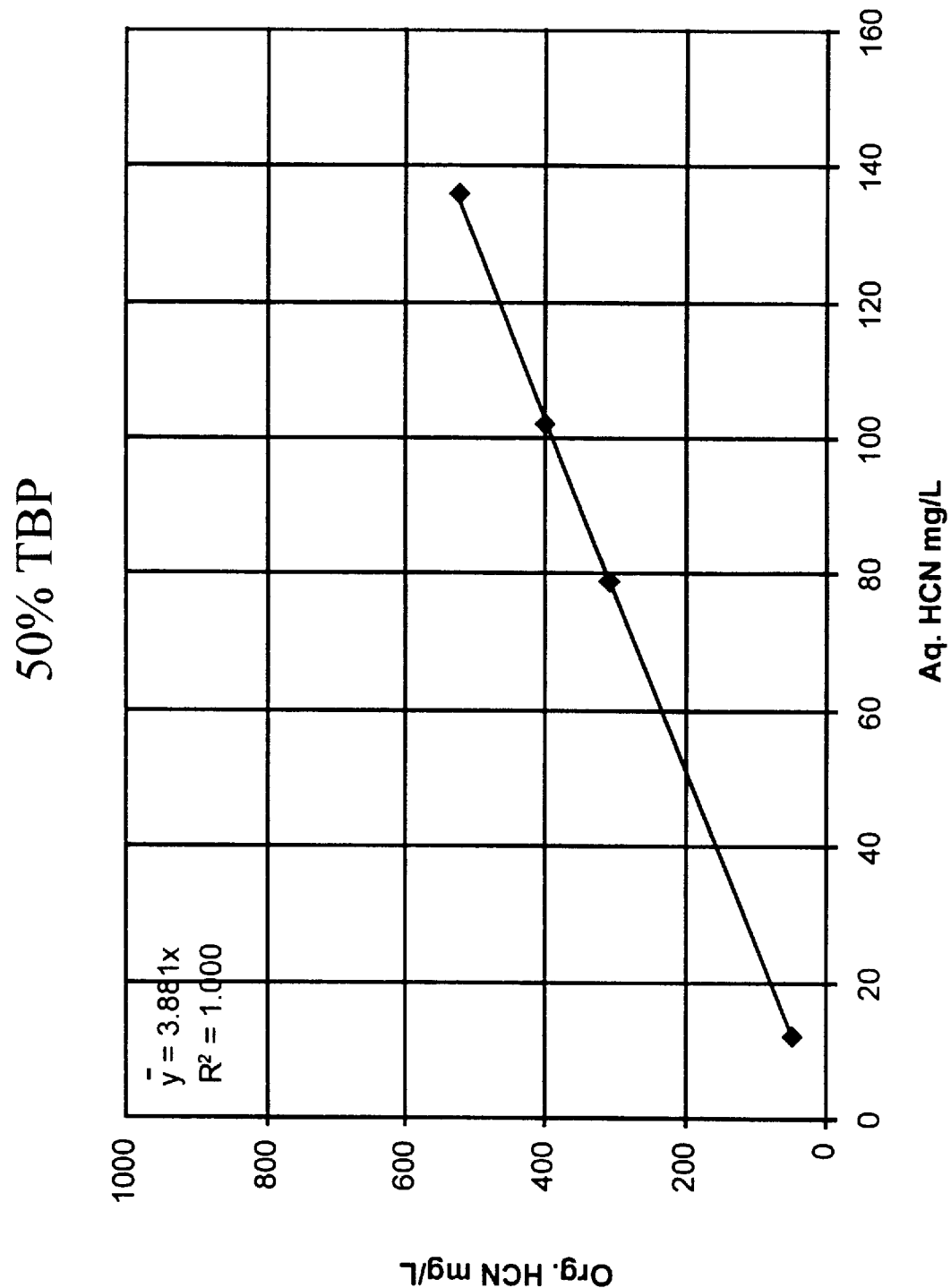
FIG. 9 is a graph showing extraction of HCN with 50% TBP.
Figure 10:
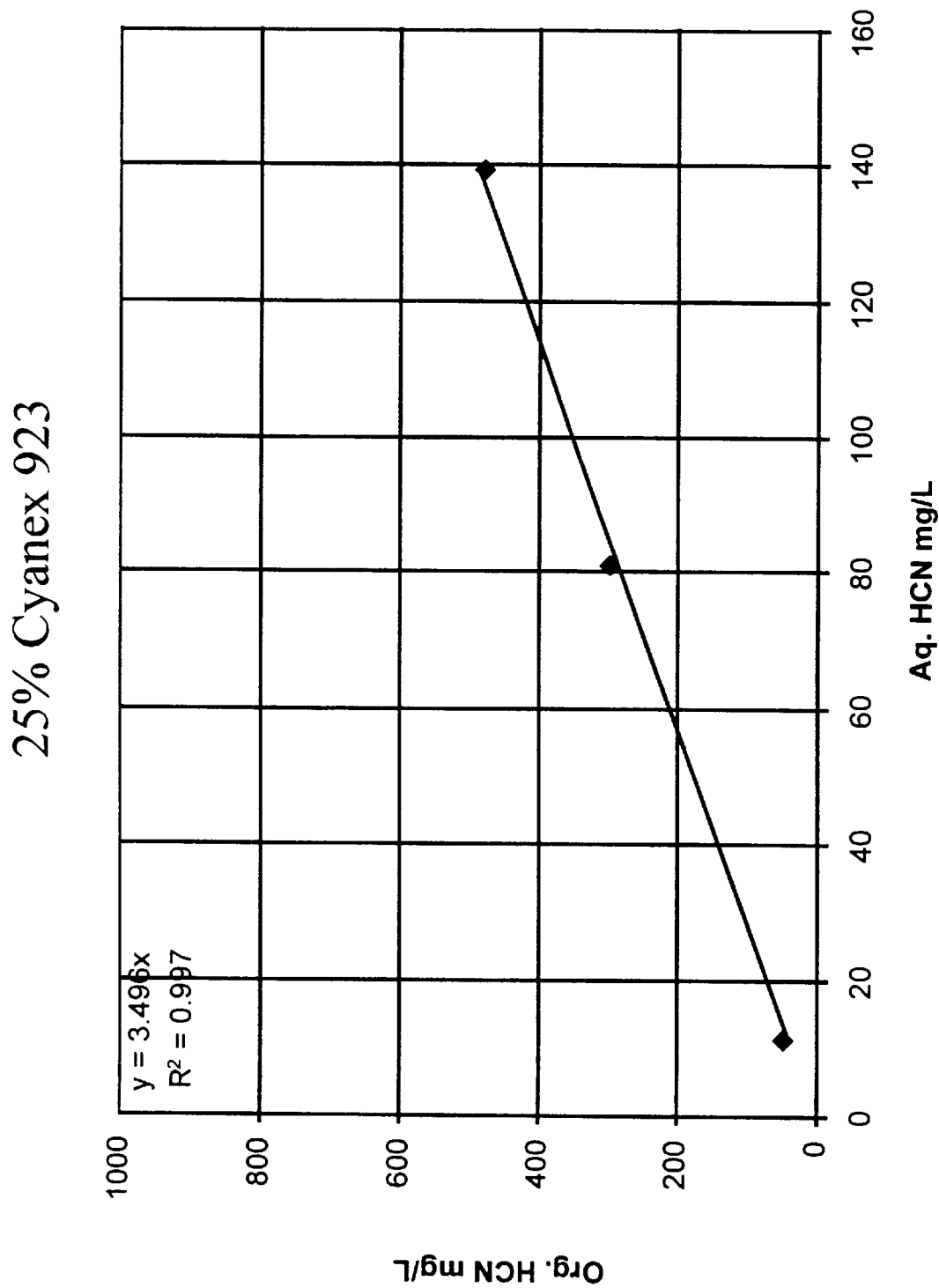
FIG. 10 is a graph showing extraction of HCN with 25% Cyanex 923.
Figure 11:
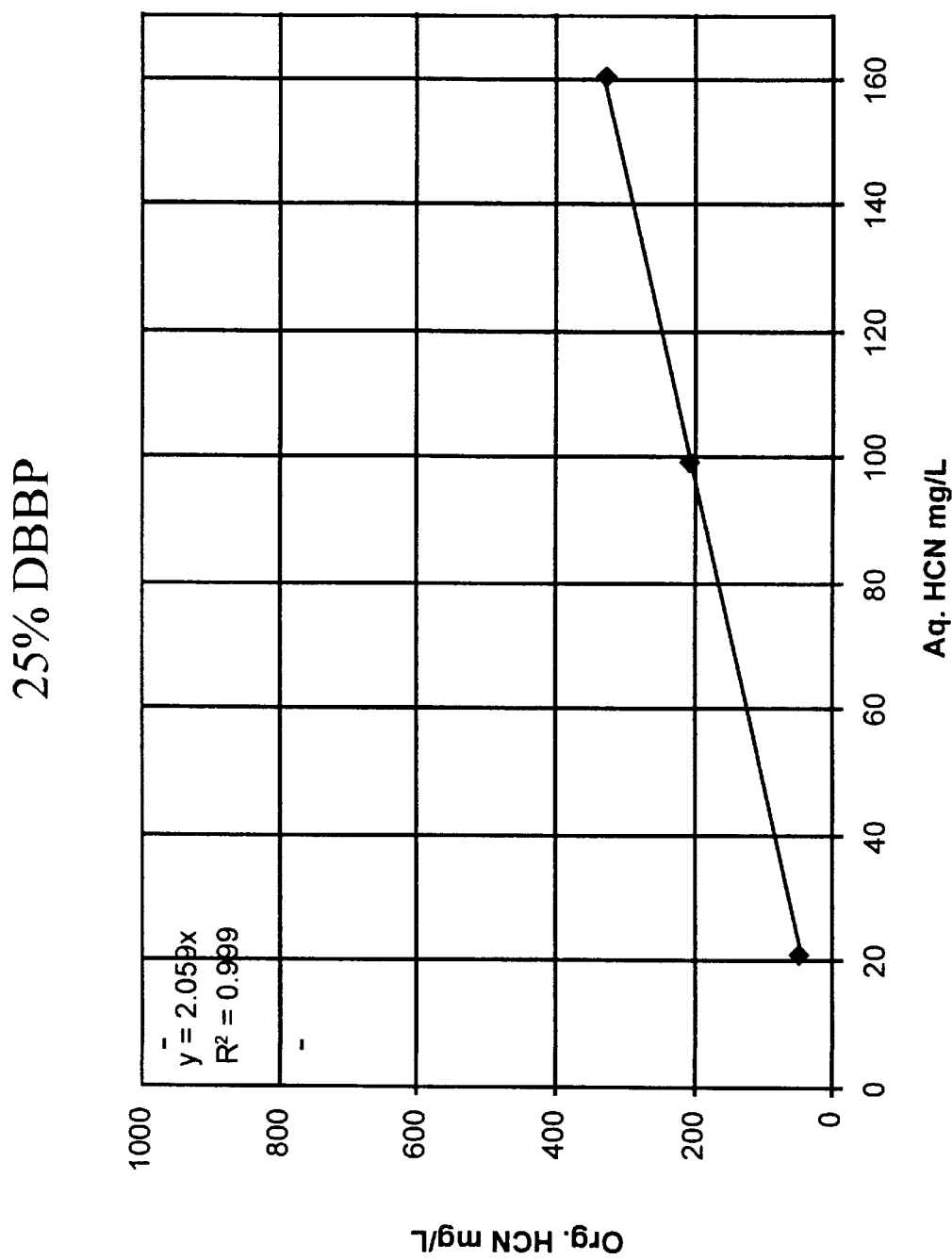
FIG. 11 is a graph showing extraction of HCN with 25% DBBP.
Figure 12:
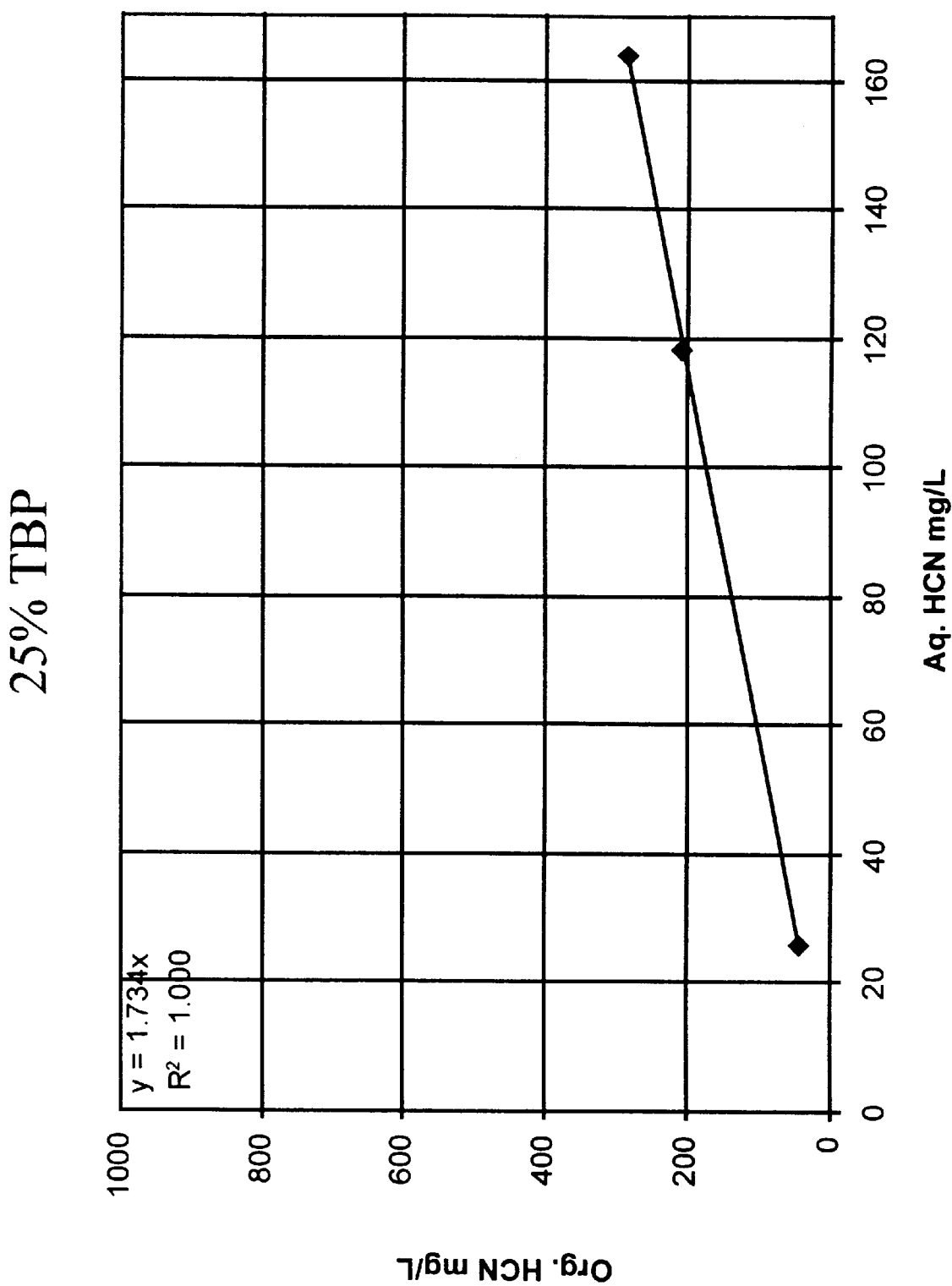
FIG. 12 is a graph showing extraction of HCN with 25% TBP.
Figure 13:
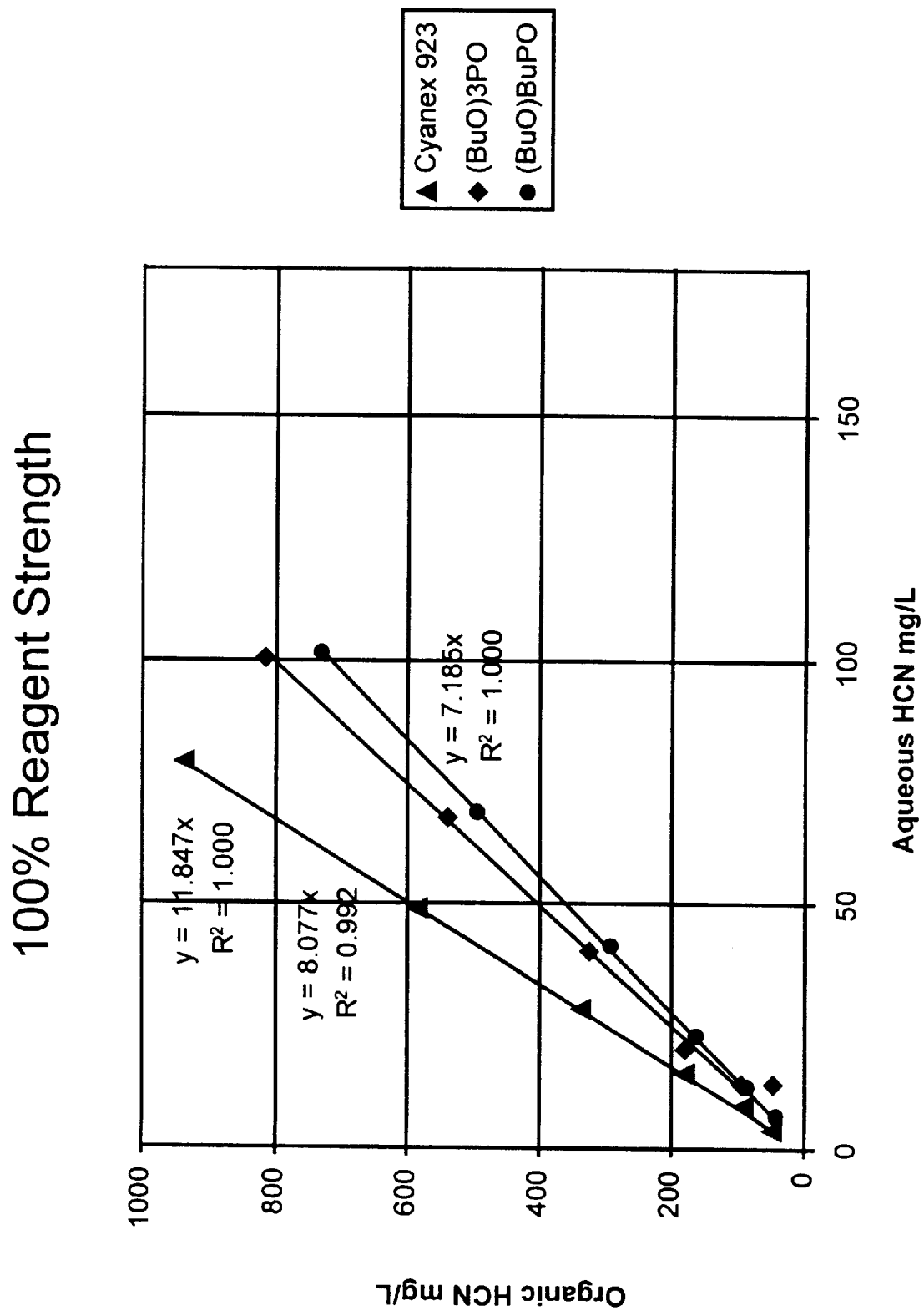
FIG. 13 is a graph showing extraction of HCN by Various Reagents at 100% Reagent Strength.
Figure 14:
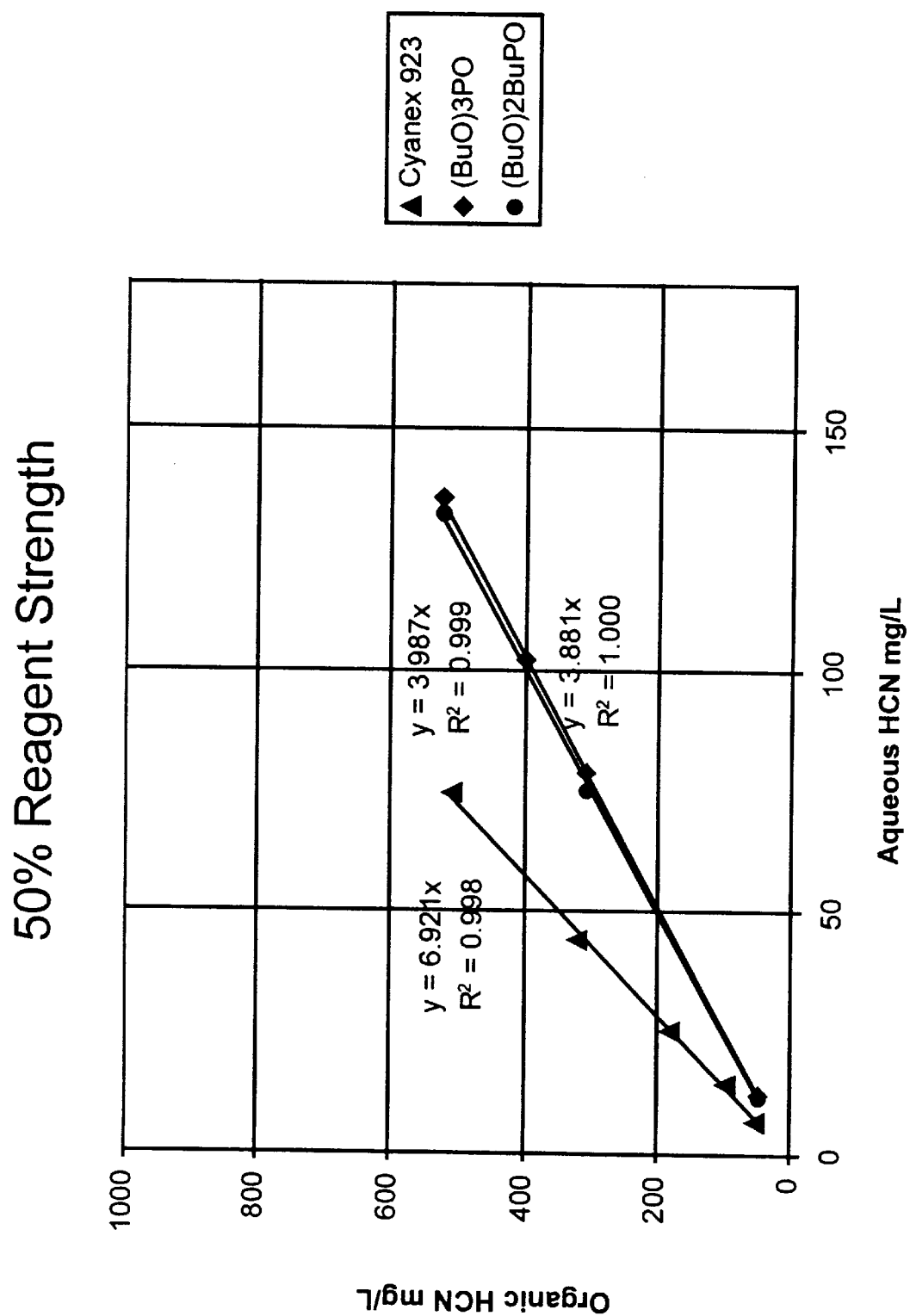
FIG. 14 is a graph showing extraction of HCN by Various Reagents at 50% Reagent Strength.
Figure 15:
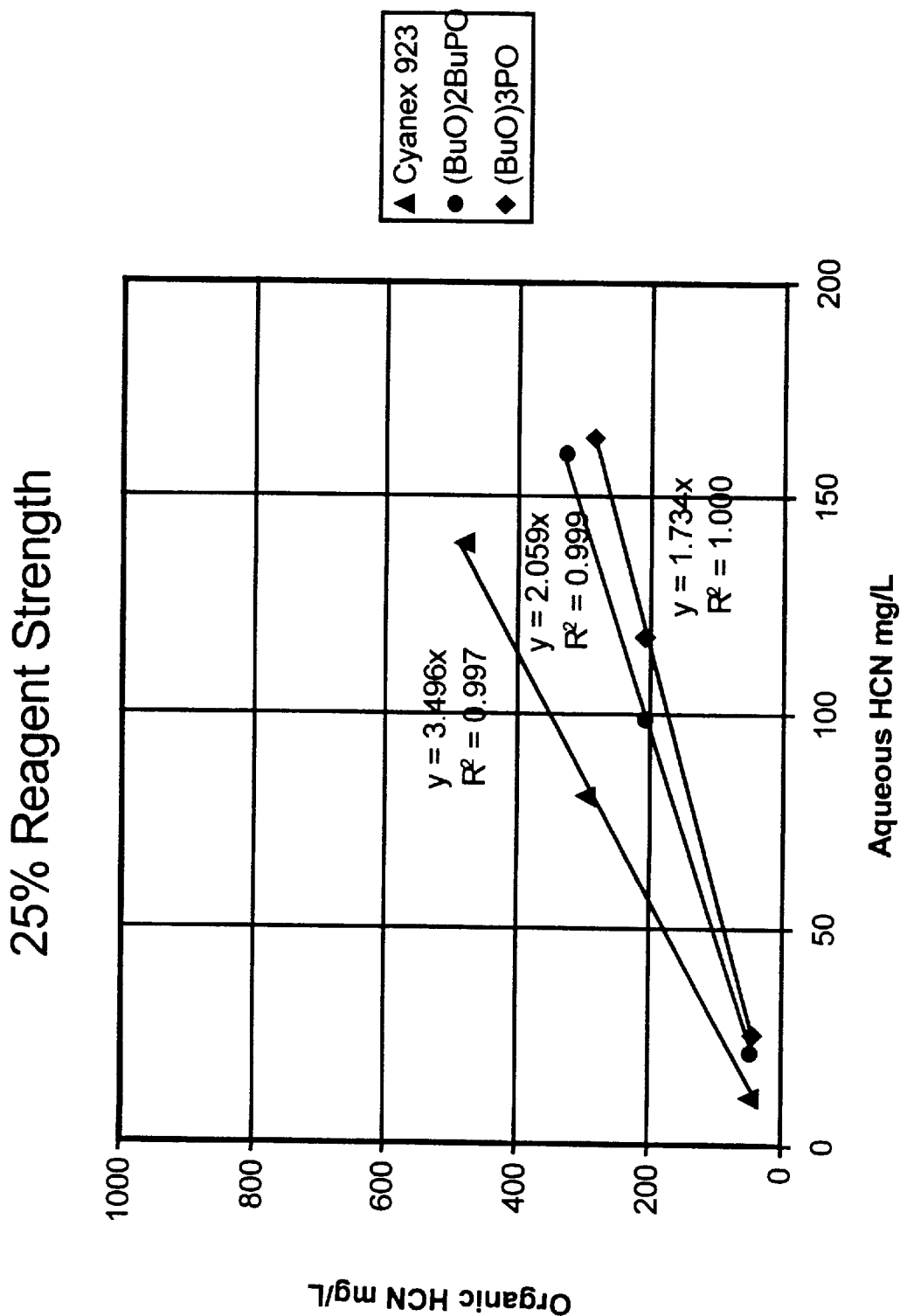
FIG. 15 is a graph showing extraction of HCN by Various Reagents at 25% Reagent Strength

The invention provides methods of using organic solvent extractants such as organophosphorous compounds to extract HCN from aqueous solutions. The aqueous solutions may be acidified to improve the equilibrium of HCN partition between aqueous and organic phases during extraction. In alternative embodiments, the organophosphorous compounds may be selected from the group consisting of tri-butyl phosphate, di-butyl-butyl-phosphonate and tri-alkyl phosphine oxides. Stripping of HCN from the organic extractant may be effected in accordance with the invention using a NaOH solution.

Exemplified embodiments of the processes of the invention utilize various solvent extractants: Cyanex 923, di-butyl-butyl-phosphonate (DBBP) and tri-butyl phosphate (TBP). The strength of HCN extraction may vary, for example as follows: Cyanex 923>DBBP>TBP. The extractant may be diluted with a diluent, such as a kerosene type diluent. As shown in the examples herein, the strength of extraction may drop in proportion to the volume % of the active ingredient in the formulated organic solution. In some embodiments, a dilution of organic solvent of approximately 50% may be preferred in order to adequately entrain or solvate the organic solvent in the organic phase and so reduce the extent to which the organic solvent dissolves in, and is lost to, the aqueous phase during extraction.

The aqueous cyanide solution treated by organic extraction in accordance with the invention preferably has a pH at which a substantial proportion of the cyanide is present in the form of dissolved hydrogen cyanide. Accordlingly, the processes of the invention may be carried out following known techniques of acidification for aqueous cyanide solutions, such as are used in AVR, AFR or MNR processes. In alternative embodiments of the invention, the pH of the aqueous solution containing dissolved cyanide may be adjusted to between 2 and 8, between 3 and 7, or between 4 and 6, prior to or coincidentally with organic extraction.

Alternative embodiments of the processes of the invention may be tested using column contactors to optimize processes for achieving low concentrations of organic solvents and cyanide in barren effluent following treatment of solutions in accordance with the invention. Alternative processes may be tested on particular leaching plant effluent solutions. In alternative embodiments, treated solutions may contain metal cyanides, such as copper and zinc cyanides, that are removed as base metal sulfides using an MNR-like process, prior to cyanide recovery.

The following examples illustrate the loading and stripping of HCN using three organic solvent types and three different concentrations of HCN in the organic solutions. The three solvent types were: tributyl phosphate (TBP, $(C_4H_9)_3P(O)$, dibutyl butyl phosphonate (DBBP, $(C_4H_9)_2P(O)C_4H_9$ and Cyanex 923 (a mixture of liquid phosphine oxides, $X_3P{=}O$ where X is an alkyl or aryl substituent, commercially available from Cytec Inc.).

The organic solvents used in the processes of the invention are preferably relatively insoluble in water and are capable of forming an organic phase separable from the aqueous phase that is being treated to preferentially solvate HCN. Suitable solvents may be selected from the group consisting of neutral organophosphorous compounds. Preferably, the solvents are selected from the group consisting of alkyl or aryl phosphates, phosphonates or phosphine oxides.

Organic liquids containing TBP, DBBP and Cyanex 923 were prepared at 100%, 50% and 25% extractant strength. The diluent used for 50% and 25% extractant was Exxsol D-80 extractant (available from Exxon). Alternative organic diluents may be used, such as liquids derived from petroleum, including aliphatic liquid mixtures.

In various embodiments, aqueous cyanide solutions for treatment were prepared to contain about 0.0077 M NaCN (0.377 g/L NaCN and 0.200 g/L CN) and 0.001 M NaOH. A known sample volume was titrated with 0.125 M $H_2SO_4$ to pH 4.00±0.05 to determine the required amount of acid to add to convert NaCN to HCN. A mildly acid pH is preferably maintained to improve the equilibrium of extraction of the neutral HCN species into the organic solvent, and to avoid polymerization of HCN in the presence of $CN^-$. In the exemplified embodiments, after acid addition the aqueous solutions contained about 200 mg/L HCN and 600 ppm $Na_2SO_4$.

In the exemplified embodiments, various phase ratios of aqueous and organic solutions were tested, using flasks or separatory fimnels. Acid was added to the solutions for extraction to maintain an acid pH in the aqueous media. In the examples, the vessels were sealed and the mixtures were stirred vigorously for 20 minutes. After this the mixtures were allowed to settle. To assay samples for cyanide content, aqueous phase samples were added to a NaOH solution and titrated with a known AgNO₃ solution (~0.018 M) using rhodamine as the titration end-point indicator. Loaded organic solution samples (i.e. the organic phase loaded with HCN following extraction) were stripped with 1 M NaOH, usually at an aqueous to organic (A/O) ratio of 1. Samples of the stripped aqueous solutions were titrated with AgNO₃. Blank tests were also performed in which the aqueous phases were deionized water.

In the case of 100% tributylphosphate, the aqueous phases after loading were clear. These were analyzed without further clarification. A test was done to confirm that there was no interference from organic entrainment. In all other tests, the aqueous phases were centrifuged prior to analysis. In alternative embodiments of the invention, solutions may be treated by centrifugation or settling to remove particulates. In the exemplary embodiments, organic phases were generally centrifuged prior to stripping only if they were cloudy, otherwise they were stripped without further clarification.

The HCN values disclosed for the examples herein are corrected for the blank results. In the case of Cyanex 923 the blank values were substantial. For the other two reagents the effect of the blank was small. The organic solutions were generally stripped at A/O 1 and usually a 10.00 mL sample was analyzed. The value of the blank titre could thus be directly subtracted from the sample titre. For the aqueous phases the blank was done at A/O 1. Thus at an A/O 4, for instance, the amount extracted was assumed to be ¼ of that at A/O 1, and at A/O 0.25, 4 times that at A/O 1. These values were subtracted from the aqueous HCN result. To illustrate, for 100% Cyanex 923 the aqueous blank sample at A/O 1 gave a titre corresponding to 0.39 mg/L HCN. For A/O 0.25, where there is four times as much organic as aqueous, it is assumed that the blank aqueous solution would indicate about 4×0.39=1.6 mg/L as HCN. This was subtracted from the titration result for the aqueous phase.

The equilibrium loading results are shown in Tables 2–10 and FIGS. 4–15. In each case the loading curves fitted well to straight lines. At all strengths of reagent, Cyanex 923 loaded the HCN most strongly. The slope of the lines on the plots is a measure of the distribution factor for the system. Distribution factor is defined as follows:

$$D_{HCN} = \frac{[HCN]_{org}}{[HCN]_{aq}}$$

A value of distribution factor greater than 1 indicates affinity for the organic solution. A value of distribution factor less than 1 indicates an affinity for the aqueous solution.

The lowest aqueous HCN levels detected were found at A/O 0.25. For Cyanex 923 this was 4 mg/L, for dibutylbutylphosphonate, 7 mg/L and for tributylphosphate, 13 mg/L. Mass balances were generally 94% or greater. In the case of dibutylbutylphosphonate it was found that 2.6 mL of the aqueous phase dissolved in 20 mL of the organic phase. This was factored into the mass balance calculation, assuming 1.3 mL of aqueous dissolved per 10 mL of organic. The pH of the aqueous phases after loading for the A/O 0.25 mixtures were measured. The pH values were 3.9 or less.

Stripping of the organic phases, such as Cyanex 923, with 1 M NaOH may result in cloudy mixtures, and the clouding may persist following centrifigation. Alternative aliphatic diluents may be used in some embodiments to change the characteristics of the extraction and, where desireable, to ameliorate the formation of salts or other species that may interfere with extraction efficiencies.

In the examples, different phase separation behaviour was noted for different mixtures. In alternative embodiments the A/O ration may be adjusted to obtain optimal phase separations and extraction efficiencies in accordance with routine experimental variation of this parameter, as taught herein. In the present examples, at 100% reagent strength (i.e. 100% organic solvent), for Cyanex 923, phases separated within 1.5 minutes. For A/O 0.5 (50% organic solvent in diluent) phase separation took 4 minutes. For A/O 0.25 the mixture had to be centrifuged to induce separation. With tributylphosphate phase separation took 1–2 minutes, except for A/O 8 which required 4 minutes. With dibutylbutylphosphonate at higher A/O ratios phase separation took about 1 minute or less. At A/O 0.25 and 0.5 the mixtures did not separate. Aqueous/Organic mixtures may be centrifuged or allowed to settle to improve phase separation.

TABLE 1

The distribution factors for each concentration

| Organic Reagent | Concentration % | $D_{HCN}$ |
|---|---|---|
| Cyanex 923 | 25 | 3.50 |
|  | 50 | 6.92 |
|  | 100 | 11.85 |
| (BuO)₂P(O)Bu | 25 | 2.06 |
|  | 50 | 3.99 |
|  | 100 | 7.19 |
| (BuO)₃P(O) | 25 | 1.73 |
|  | 50 | 3.88 |
|  | 100 | 8.08 |

TABLE 2

Extraction of HCN with 100% Cyanex 923.

| A/O or Sample | Aq. Vol. (mL) | Org. Vol. (mL) | Estd. Final Aq. Vol. (mL) | Aq. HCN (mg/L) | Org. HCN (mg/L) | Mass Balance (%) |
|---|---|---|---|---|---|---|
| 8 | 80 | 10 | 82.841 | 79.3 | 937.2 | 95.2 |
| 4 | 60 | 15 | 62.13 | 49.0 | 583.0 | 93.9 |
| 2 | 40 | 20 | 41.42 | 28.2 | 335.7 | 94.1 |
| 1 | 25 | 25 | 25.887 | 15.1 | 181.2 | 94.1 |
| 0.5 | 25 | 50 | 25.887 | 8.5 | 94.0 | 94.0 |
| 0.25 | 15 | 60 | 15.532 | 4.0 | 49.5 | 96.6 |

TABLE 3

Extraction of HCN with 100% DBBP.

| A/O or Sample | Aq. Vol. (mL) | Org. Vol. (mL) | Estd. Final Aq. Vol. (mL) | Aq. HCN (mg/L) | Org. HCN (mg/L) | Mass Balance (%) |
|---|---|---|---|---|---|---|
| 7.93651 | 103.5 | 12.6 | 101.9 | 101.2 | 730.9 | 99.0 |
| 4 | 62.1 | 15 | 60.2 | 68.9 | 495.8 | 99.9 |
| 2 | 41.4 | 20 | 38.8 | 41.7 | 291.6 | 98.0 |
| 1 | 25.9 | 25 | 22.6 | 22.9 | 163.0 | 97.9 |
| 0.5 | 20.7 | 40 | 15.5 | 12.5 | 86.2 | 97.7 |
| 0.25 | 10.4 | 40 | 5.2 | 6.8 | 43.9 | 96.4 |

TABLE 4

Extraction of HCN with 100% TBP.

| A/O or Sample | Aq. Vol. (mL) | Org. Vol. (mL) | Estd. Final Aq. Vol. (mL) | Aq. HCN (mg/L) | Org. HCN (mg/L) | Mass Balance (%) |
|---|---|---|---|---|---|---|
| 8 | 40 | 5 | 41.408 | 100.2 | 817.2 | 99.8 |
| 4 | 40 | 10 | 41.409 | 67.7 | 542.0 | 99.7 |
| 1.9861 | 20 | 10.07 | 20.703 | 40.1 | 323.3 | 99.1 |
| 1 | 10 | 10 | 10.354 | 20.0 | 180.8 | 97.7 |
| 0.5 | 10 | 20 | 10.351 | 12.9 | 97.4 | 101.0 |
| 0.25 | 10 | 40 | 10.352 | 12.8 | 49.8 | 103.0 |

TABLE 5

Extraction of HCN with 50% Cyanex 923.

| A/O or Sample | Aq. Vol. (mL) | Org. Vol. (mL) | Estd. Final Aq. Vol. (mL) | Aq. HCN (mg/L) | Org. HCN (mg/L) | Mass Balance (%) |
|---|---|---|---|---|---|---|
| 4 | 60 | 15 | 62.137 | 74.7 | 508.3 | 97.2 |
| 2 | 40 | 20 | 41.423 | 44.2 | 318.2 | 97.4 |
| 1 | 25 | 25 | 25.89 | 25.4 | 179.6 | 97.9 |
| 0.50125 | 20 | 39.9 | 20.713 | 14.1 | 96.2 | 98.3 |
| 0.25 | 15 | 60 | 15.532 | 6.8 | 50.1 | 98.6 |

TABLE 6

Extraction of HCN with 50% DBBP.

| A/O or Sample | Aq. Vol. (mL) | Org. Vol. (mL) | Estd. Final Aq. Vol. (mL) | Aq. HCN (mg/L) | Org. HCN (mg/L) | Mass Balance (%) |
|---|---|---|---|---|---|---|
| 7.99574 | 75 | 9.38 | 77.65 | 132.7 | 523.1 | 96.9 |
| 2.5 | 50 | 20 | 51.768 | 75.1 | 309.7 | 96.4 |
| 0.25 | 20 | 80 | 20.707 | 11.6 | 48.0 | 97.5 |

TABLE 7

Extraction of HCN with 50% TBP.

| A/O or Sample | Aq. Vol. (mL) | Org. Vol. (mL) | Estd. Final Aq. Vol. (mL) | Aq. HCN (mg/L) | Org. HCN (mg/L) | Mass Balance (%) |
|---|---|---|---|---|---|---|
| 8 | 80 | 10 | 82.84 | 136.0 | 523.3 | 98.7 |
| 4 | 80 | 20 | 82.839 | 102.1 | 399.0 | 98.3 |
| 2.5 | 50 | 20 | 51.776 | 78.8 | 309.9 | 98.3 |
| 0.25 | 20 | 80 | 20.71 | 12.1 | 48.0 | 97.9 |

TABLE 8

Extraction of HCN with 25% Cyanex 923.

| A/O or Sample | Aq. Vol. (mL) | Org. Vol. (mL) | Estd. Final Aq. Vol. (mL) | Aq. HCN (mg/L) | Org. HCN (mg/L) | Mass Balance (%) |
|---|---|---|---|---|---|---|
| 8 | 80 | 10 | 82.827 | 139.1 | 478.4 | 98.2 |
| 2.5 | 50 | 20 | 51.763 | 81.2 | 296.4 | 97.6 |
| 0.25 | 20 | 80 | 20.713 | 11.1 | 48.5 | 99.1 |

TABLE 9

Extraction of HCN with 25% DBBP.

| A/O or Sample | Aq. Vol. (mL) | Org. Vol. (mL) | Estd. Final Aq. Vol. (mL) | Aq. HCN (mg/L) | Org. HCN (mg/L) | Mass Balance (%) |
|---|---|---|---|---|---|---|
| 8 | 80 | 10 | 82.855 | 160.4 | 326.6 | 98.6 |
| 2 | 50 | 25 | 51.785 | 99.1 | 209.4 | 98.8 |
| 0.25 | 20 | 80 | 20.715 | 21.2 | 46.7 | 99.4 |

TABLE 10

Extraction of HCN with 25% TBP.

| A/O or Sample | Aq. Vol. (mL) | Org. Vol. (mL) | Estd. Final Aq. Vol. (mL) | Aq. HCN (mg/L) | Org. HCN (mg/L) | Mass Balance (%) |
|---|---|---|---|---|---|---|
| 8 | 80 | 10 | 82.819 | 163.9 | 283.0 | 98.6 |
| 2.5 | 50 | 20 | 51.765 | 118.1 | 206.3 | 98.5 |
| 0.25 | 20 | 80 | 20.705 | 25.8 | 44.9 | 99.3 |

Figure 16:
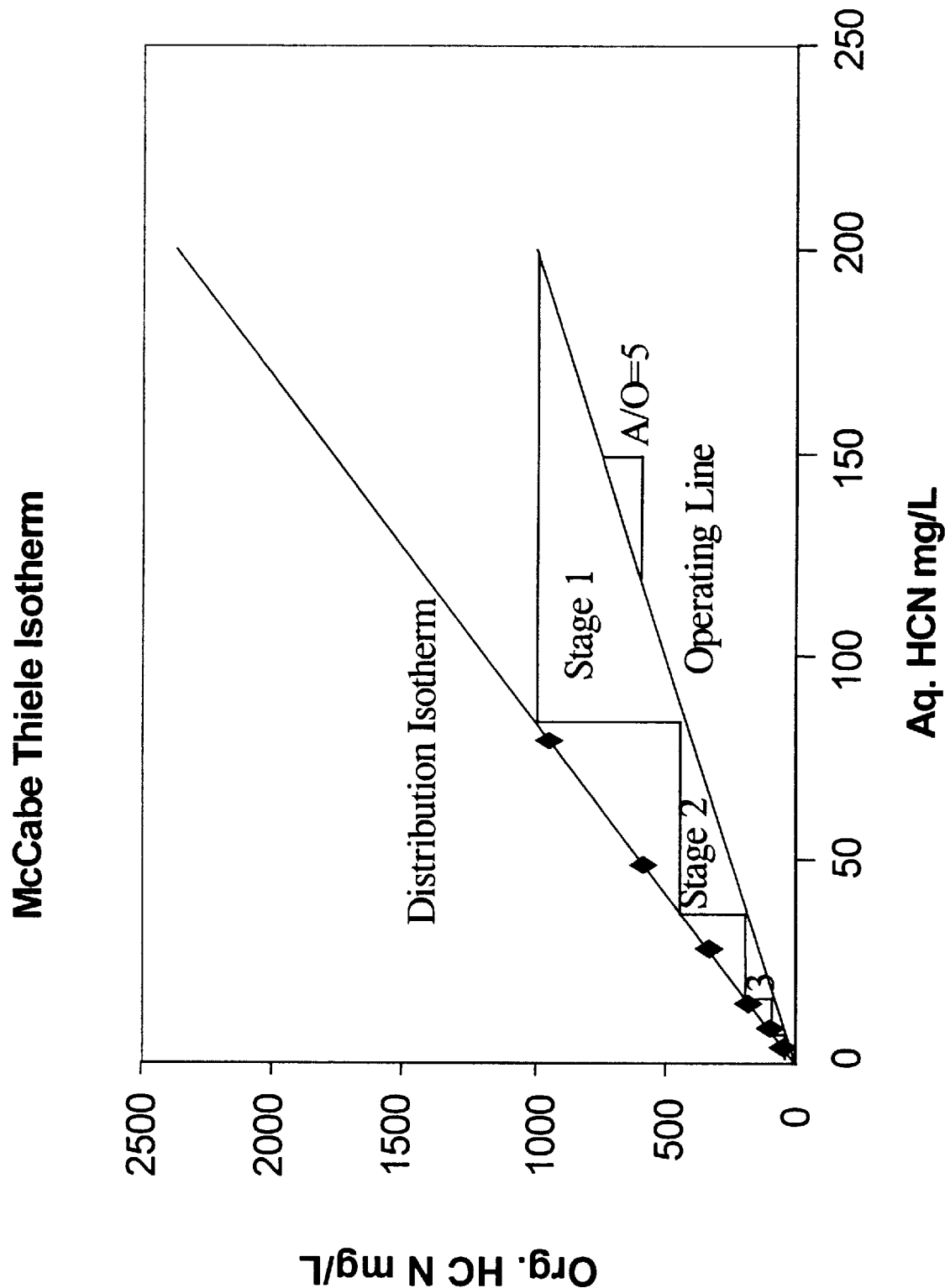
FIG. 16 is a schematic McCabe-Thiele Isotherm for Cyanide Recovery Using 100% Cyanex 923.

Alternative embodiments of the invention may utilize a number of extraction stages and alternative modes of contact of the organic and aqueous solution. FIG. 16 is a schematic McCabe-Thiele isotherm for the recovery of cyanide from a 200 ppm solution. Five stages of countercurrent extraction is sufficient to recover the cyanide down to less than 10 ppm (probably less than 5 ppm). This extraction corresponds to >95% cyanide recovery. At high pH (above 8 for example in some embodiments), the equilibrium will shift towards increasing concentrations of ionic CN and decreasing concentrations of neutral HCN. It is therefore preferable to maintain a sufficiently low pH to favour the formation of HCN, which will be partitioned into the organic phase during extractions.

In some embodiments, a column type contactor may be preferred for extractions. Column contactors may have a number of advantages. A column may provide for a large number of stages, all within the same piece of equipment. A column may be sealed, so that HCN gas can not evolve into the surrounding atmosphere. Also, columns may be advantageously adapted for handling solids (crud), if solids are formed in the extraction process.

The testing and assay procedures set out herein may be used, together with known testing methods, to adapt the processes of the invention for use with alternative organic solvents, alternative diluents, alternative concentrations of solvent in diluent, alternative extraction pHs, alternative extraction and phase separation protocols. Accordingly, the specific examples set out herein of the methods of the invention are merely illustrative of the alternative aspects of the broadly defined invention as claimed.

What is claimed is:

1. A process for treating an aqueous ore processing waste solution containing dissolved hydrogen cyanide comprising extracting hydrogen cyanide from the solution with an organic solvent.

2. The process of claim 1 wherein the organic solvent comprises a neutral organophosphorous compound.

3. The process of claim 2 wherein the organophosphorous compound is selected from the group consisting of alkyl or aryl substituted phosphates, phosphonates and phosphine oxides.

4. The process of claim 2 wherein the organophosphorus compound is selected from the group consisting of tri-butyl phosphate, di-butyl-butyl-phosphonate and tri-alkyl phosphine oxides.

5. The process of claim 2 wherein the organophosphorous compound is tri-butyl phosphate.

6. The process of claim 2 wherein the organophosphorus compound is di-butyl-butyl-phosphonate.

7. The process of claim 2 wherein the organophosphorous compound is a tri-alkyl phosphine oxide.

8. The process of claim 1 wherein the pH of the aqueous solution containing dissolved cyanide is adjusted to between 2 and 8.

9. The process of claim 1 wherein the pH of the aqueous solution containing dissolved cyanide is adjusted to between 3 and 7.

10. The process of claim 1 wherein the pH of the aqueous solution containing dissolved cyanide is adjusted to between 4 and 6.

11. The process of claim 1 further comprising contacting the organic solvent, following the extracting step, with a basic aqueous solution to strip cyanide from the organic solvent into a basic aqueous cyanide strip solution.

12. The process of claim 1 wherein the organic solvent is diluted in an organic diluent.

13. The process of claim 12 wherein the concentration of the organic solvent in the organic diluent is at least 50%.

14. The process of claim 1 wherein the organic solvent comprises a neutral polar organic compound.

15. The process of claim 1, wherein the HCN distribution factor of the organic solvent is greater than 2.5.

16. The process of claim 1, wherein the HCN distribution factor of the organic solvent is greater than 5.

17. The process of claim 1, wherein the organic solvent has an aqueous solubility of less than about 1% by mass percent at 25° C.

18. The process of claim 1, wherein the organic solvent has a boiling point of greater than about 75° C.

19. The process of claim 1, wherein the process is carried out to extract at least 50% of hydrogen cyanide from the aqueous solution.

20. The process of claim 1, wherein the process is carried out to extract at least 95% of the hydrogen cyanide from the aqueous solution.

21. The process of claim 1, wherein the process is carried out to reduce the concentration of the hydrogen cyanide in the aqueous solution to less than 10 ppm.

22. The process of claim 1, wherein the ore processing waste solution is a gold ore processing waste solution.

* * * * *

UNITED STATES PATENT AND TRADEMARK OFFICE
CERTIFICATE OF CORRECTION

PATENT NO.   : 6,200,545 B1                                   Page 1 of 1
DATED        : March 13, 2001
INVENTOR(S)  : Dreisinger It is certified that error appears in the above-identified patent and that said Letters Patent is hereby corrected as shown below:

<u>Title page,</u>
Insert:
-- [73], Assignee: Dreisinger Consulting Inc. of Delta,
British Columbia, Canada and
Placer Dome Inc. of Vancouver, British Columbia, Canada --

Signed and Sealed this

Twenty-ninth Day of January, 2002

Attest:

JAMES E. ROGAN
Attesting Officer       Director of the United States Patent and Trademark Office